Aug. 9, 1932.  J. P. CURD  1,870,557
SCREW PLUG SLIDE VALVE
Filed Dec. 13, 1929
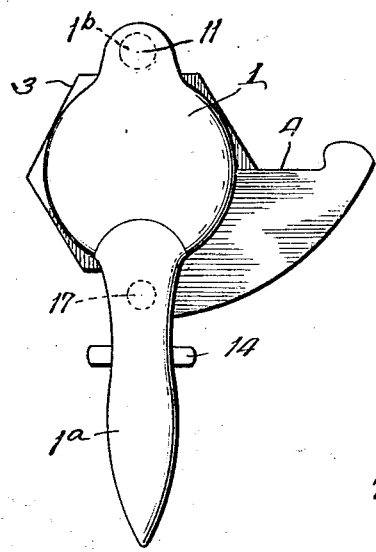
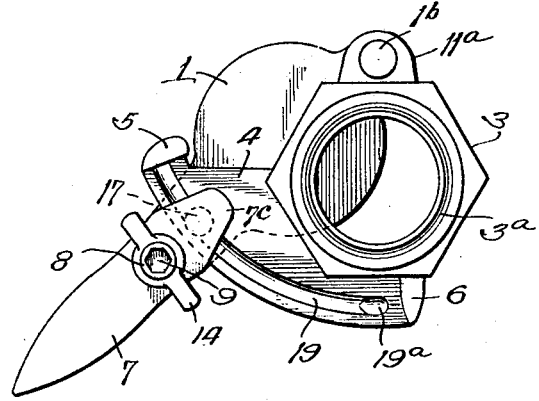
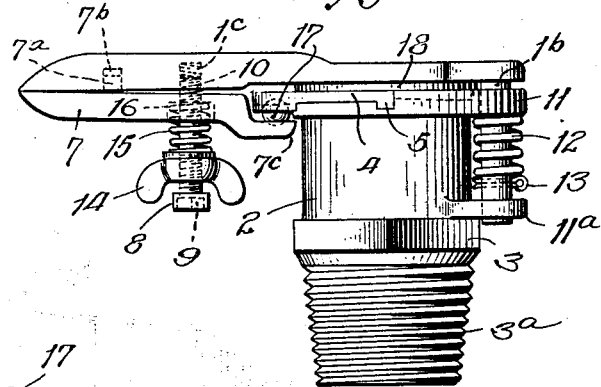
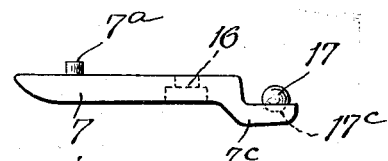
John Price Curd  INVENTOR Patented Aug. 9, 1932

1,870,557

UNITED STATES PATENT OFFICE

JOHN PRICE CURD, OF LOUISVILLE, KENTUCKY

SCREW PLUG SLIDE VALVE

Application filed December 13, 1929. Serial No. 414,711.

My invention relates to sliding valves or gates adapted to be securely and removably attached to the threaded outlets of tanks, barrels or other receptacles, and used for the purpose of readily draining them of any thick fluids stored therein, such as tar, syrups, thick oils or other fluids. And my screw-plug slide valve consists of a hollow cylindrical plug-like body with threads on the lower outer side adapted to mesh with threads on the inner sides of the outlet of a tank, barrel or other receptacles as the valve is screwed into normal operative position. Over the upper end of said hollow, cylindrical body is a sliding gate which is held spring-pressed in its operative position by a strong integral pintle. The sliding gate is provided with a handle and is adapted in manual operation to slide open and shut at the option of the operator.

The general object of my invention is to devise a valve that can be readily screwed into the threaded outlet of a tank, barrel or other receptacles for service drainage,—a drainage valve that can be easily opened or closed and securely chocked against leakage by spring pressure as it is forced into its closed position.

Some detail objects of my invention are:
first, to provide a strong sliding gate for my valve having at one end a combination handle and at the other end, an integral pivot pin adapted to hinge the gate operatively to the main body of my screw-plug valve by passing through two adjacent, perforated hinge lugs on the top and side, respectively, of said body; second, to design the installation of a suitable gasket adapted to be interposed operatively between the main fixed body of my valve and the sliding gate to render the joint therein liquid-tight when the gate is completely closed; third, spring-pressed means in connection with said pivot pin, adapted not only to hold the pintle in its hinges but to exert sufficient pressure on the sliding gate to hold the pintle end of the gate closely against said gasket; fourth, to provide a flat curved lug integral with the main body of my valve and adapted to guide the gate in its opening and closing movements; fifth, to provide integral abutment spurs on either end of said curved lug adapted to limit to a predetermined extent the opening and the closing movements of the gate; sixth, to devise a combination handle composed of two separate parts provided with flat adjacent faces and spring-pressed clamping mechanism and adapted to be held together in their normal operative position under a gradient of elastic tension which may be readily increased or decreased at the option of the operator; and, seventh, to provide means for a ball-bearing system between said combination handle and said guide lug, in which a positive lock is devised against opening said gate without a key.

All of these objects are attained in my present invention; and my new and useful improvements in screw-plug slide valves illustrated in the enclosed drawing forming a part of this specification, constitute a practical screw-plug slide valve adapted for the service draining of tanks, barrels and other receptacles and embodying the aforesaid novel parts, means and accessories as well as other new and useful details of construction, arrangement and combination of parts, all of which together with their functions will be described in detail with reference to said drawing; and will be definitely set out in the claims that follow the description.

In said drawing, Fig. I is a rectangular projection of my screw-plug slide valve showing the full top of it, with the gate closed. Fig. II is rectangular projection of the under side of my screw-plug slide valve with the gate partly open, showing the under part of my combination handle and my ball-bearing system, and locking means.

Fig. III is a side elevation of my entire screw-plug slide valve assembled for use. Fig. IV is a side elevation of the under section of my combination handle and its retaining lug showing clearly also the lock-screw hole and its counterbore the seat of the tension spring and also the bearing ball in its retaining socket.

My screw-plug-slide valve has been intended by me for general use where an intermittent service valve would be needed for draining tanks and other receptacles of heavy liquids. Accordingly, with this general purpose and these special objects in view, I will now describe my invention in detail, specifying the various parts and explaining the operatons and uses of said parts and the combinations thereof, as illustrated in the drawing hereinabove designated, in which similar characters point out and refer to similar parts throughout the several views.

In Fig. I the numeral 1 represents the gate of my valve; 1a represents the upper section of the handle thereof and in Fig. III, 2 is the hollow cylindrical body of my valve; and 3 is the hexagonal part of the body of my valve adapted to take a wrench for screwing the valve into a receptacle for service. 3a is a taper-threaded part of my valve adapted to fit and screw into various sizes of outlet holes in tanks or barrels. The numeral 4 designates my flat curved or circular shaped lug which I use to help guide the opening and closing movements of the valve gate. 5 is the integral abutment spur on the outer end of the flat curved lug adapted to engage the valve handle as it swings outward to prevent its opening beyond a predetermined distance; and 6 is the integral abutment spur on the inner end of said lug adapted as a positive stop for the gate's movement as it comes to a complete close.

In Fig. IV, 7 is the lower section of my combination handle and 7a is the retaining lug adapted to fit into the matrix 7b in the under side of the upper section 1a of my combination handle to prevent slipping movement of section 7 after having been clamped to section 1a by means of my spring-pressed clamping mechanism.

In Figs. II and III, 8 is the head of my locking screw in the handle; 9 is the hexagon socket for the locking key. 10 is the body of the screw and 1c is the threaded matrix for the screw 10. 11 is the upper hinge lug and 11a is the lower hinge lug of pintel 1b.

In assembling the parts of my valve, pintle spring 12 is placed between hinges 11 and 11a in line with pintle holes; then the pintle 1b is pushed down through hinge 11 and spring 12 and then through hinge lug 11a, spring 12 is then compressed up against hinge lug 11 and cotter pin 13 is pushed through its hole in pintle 1b. This securely locks pintle 1b in its operative position under a predetermined spring-pressure. Ball 17 is then placed in its socket 17a and lug 7a is pushed into matrix 7b in handle section 1a and wing-nut 14 is screwed onto lock bolt 10 and then clamping spring 15 is pushed onto lock bolt 10 and the bolt is then slipped through screwhole 16 in handle section 7 and screwed into threaded matrix 1c in handle section 1a, but not all the way to the bottom of matrix 10a. This process seats the spring 15 in the counterbore 16. Now 7c is an integral spur on the end of handle section 7 adapted to extend forward under the curved lug 4 when handle section 7 is fixed in its normal operative position; and in the upper plane surface of spur 7c is a circular pit 17c adapted to hold in its operative position the ball 17 as seen in Figs. III and IV. Now in Fig. II may be seen, in the plane lower surface of the curved lug 4, the ball race 19 extending between the abutment spurs 5 and 6 in a circular groove described about the axis of pintle 1b. And in the process of assembling, the upper part of ball 17 in its retaining socket 17a fits into ball race 19 and so rolls in said race back and forth under the pressure of spring 15 as the gate is swung in its opening and closing movements. But along the median line of said ball race 19 and near the closing abutment spur 6, Fig. II, is an oblong pit 19a deeper at its outer end than at the inner end and adapted to receive the ball 17 at the complete closing of the valve gate. Now if I desire to lock the valve gate, I first screw up the wing-nut 14 against spring 15 until the coils of the spring are set rigidly together then with a key in socket 9 I screw up the lock-bolt 10 until the head 8 is set rigidly against wing-nut 14. Ball 17 now in the deeper end of pit 19a cannot be rolled out of pit 19a and the valve gate 1 is securely locked so it cannot be forced open without breakage or with the help of the key or other tools.

Furthermore, in Fig. III it can be seen how securely the valve gate 1 when closed is held against the gasket 18 by means of the two compression springs 15 and 12 fixed at diametrically opposite points, so that equilization of pressure on the gasket 18 for an absolutely tight fit can be readily brought about by the operator.

In consideration of the fact that I have two helical compression springs 15 and 12 fixed at diametrically opposite sides of my valve gate 1, adapted to equalize the pressure of the gate 1 against the gasket 18, enables me to make my gasket 18 of pliant material, like raw-hide or of rigid material like copper, provided the underside of my valve gate be plane-ground and the exposed broad edge of my gasket 18 be plane-ground also.

Now in operating the valve, the operator should use the wing-nut 14 to increase or decrease the pressure of the swinging gate upon the gasket 18. This wing-nut and coacting parts are also adapted to take up the wear on the gasket.

My screw-plug slide valve of course, may be readily provided with inside threads instead of outside threads and so adapted to screw on over a tank nozzle, and operate as a screw-cap slide valve; or other means of attachment may be used without departing from the spirit of the invention.

Having thus described the various features of my invention, the detail construction, arrangement and combination of its parts, as well as their functions, all involved in the art of making and using my new and useful improvements in screw-plug slide valves, what I consider in my invention as new and useful and representative of efficiency and practicability in a drain valve, such features as I desire outlined and granted me in Letters Patent, I have set forth specifically in the following claims:—

1. In a screw-plug slide valve, a hollow cylindrical body, threads on the lower outside of the body adapted to screw into the outlet of a tank, a spring-pressed cover or gate attached to said body by means of a pivot pin and adapted to slide over the upper side of the body, a pliant annular gasket fixed in the upper rim of said body and adapted to render liquid-tight the joint between the body and the gate when closed, in combination with a circular lug on the upper rim of said body having on its under side a circular ball race, a combination handle adapted to operate said cover or gate, a ball in said handle adapted to roll in the circular ball race and guide the gate as it opens and closes and spring-pressed means attached to said combination handle adapted to hold the ball operatively in the race.

2. In a slide valve adapted to be attached operatively to a fluid receptacle to drain its contents in service, a hollow cylindrical body, means for attaching said valve to said receptacle, a pliant annular gasket fixed in the upper rim of said body and standing a little above said rim, a spring-pressed gate adapted to slide over said gasket in opening and closing the valve, an integral pintle on said gate adapted to control its movements, a combination handle on said gate diametrically opposite said pintle, a spring-pressed means in connection with the pintle and the handle adapted to force the gate down upon the gasket with equalizing pressure to make the valve liquid-tight when the gate is closed, a curved integral lug on said body, abutment spurs on the underside of either end of said lug adapted to limit the movement of the handle, a circular ball race extending between these two spurs, an oblong ball pit in said race near the closing end thereof, a removable section of the combination handle, a lock-bolt adapted to fasten it to the fixed section, a compression spring and a wing-nut on said lock-bolt adapted to exert pressure on said removable section, a ball pit in the end of said removable section adapted to hold a ball to roll in the ball race in the curved lug when the removable section is in its normal operative position and a socket in the head of the lock-bolt adapted to receive a hexagon key to lock the gate securely in its closed position, substantially as described.

3. In a slide valve designed to be attached operatively to a fluid container, a pintle-operative gate fastened thereto and adapted to be swung open or shut in normal intermittent service, a circular lug on said valve adapted to guide the gate in its opening and closing, means on said gate adapted to contact operatively with said lug, abutment spurs at either end of said circular lug acting as abutment blocks for the contiguous parts of the sliding gate and adapted to limit both the opening and the closing movement of the gate in its regular service operation and ball bearing means coacting between said lug and the parts of the sliding gate contiguous thereto and designed to facilitate the movement of the gate in the opening and closing thereof.

4. In a slide valve adapted to be operatively attached to a fluid container and designed to drain the fluid therefrom intermittently in normal service, the combination of a hollow cylindrical body open at the ends; a swinging gate operatively attached by spring-pressed means to said cylindrical body and adapted to slide closely over the outer end thereof; a combination handle on said gate adapted with spring-pressed means to press the gate more or less tightly against the outer end of said cylindrical body; a broad flat, circular lug on the outer rim of the cylindrical body; a circular ball race in under side of said circular lug; special depressions in the ball race at the valve-closing end of said lug deeper than said ball race and adapted to receive balls; a spring-pressed removable section of the combination handle held in its operative position by means of a dowel pin and a stay bolt carrying a compression spring and a lock nut and adapted to extend out under said circular lug; ball pits in the upper face of said off-set spur carrying balls adapted in normal operation to roll in said race; and a key socket in the head of said stay bolt adapted for screwing the stay bolt in more deeply for locking said balls in said depressions at the closing end of the race when the valve is closed.

5. In a slide valve designed to be attached operatively to a fluid container and adapted to be opened and closed intermittently to drain the fluid therefrom in normal service; an annular gasket with plane top around the mouth of the valve; a sliding gate operatively attached to the valve and adapted to slide over the plane surface of the gasket; two springs acting at diametrically opposite points adapted to press the gate uniformly against the gasket; a circular lug on said valve adapted to guide and limit the movement of the sliding gate in its opening and closing; a compound handle on the sliding gate, provided with an adjustable portion adapted to operate as a pressure guide under the circular lug and a ball bearing between the pressure guide and the circular lug to lessen their friction in operation.

6. A sliding valve consisting of a hollow cylindrical body designed to be operatively attached to a fluid container in such a way as to drain the contents therefrom in normal service; a plane ground annular gasket imbedded in the outer rim around the mouth of said body and reaching a little above said rim; a valve gate swinging on a pintle hinge removably attached to one side of said cylindrical body; a plane-ground surface on the inner side of the swinging gate adapted to contact with the plane surface of said gasket and to cover it entirely when the gate is closed; a combination handle on the swinging gate diametrically opposite said pintle hinge; a removable section of my combination handle; means for fastening the removable section to the main part of the combination handle under spring-pressure; means on the main part and the sectional part of my combination handle adapted to hold these parts in respect in their normal operative position; a circular lug on said cylindrical body adapted to guide the swinging gate; an integral ball-bearing spur on the inner end of the removable section of my combination handle, extending over under the circular lug and provided with a ball-retaining pit on its inner surface for carrying a ball adapted to roll along a ball race in the under side of said circular lug to minimize the friction between the swinging gate and the circular guiding lug in the opening and the closing of the valve gate; means on the pintle-hinge side of the valve adapted to hold that side of the swinging gate firmly spring-pressed to the surface of the gasket; and coacting spring-pressed means on the other side of the valve diametrically opposite the pintle-hinge, adapted to counterbalance the pressure of the pintle spring, the combined mechanism being designed to equalize the pressure and wear upon the surface of the gasket, whether the gate be open or closed, substantially as described.

In testimony whereof I have hereunto set my signature, this 23rd day of October, 1929.

JOHN PRICE CURD.